(12) United States Patent
Hammer et al.

(10) Patent No.: US 7,201,088 B2
(45) Date of Patent: Apr. 10, 2007

(54) LATHE

(75) Inventors: Eberhard Hammer, Hardt (DE); Helmut Weisser, St. Georgen (DE)

(73) Assignee: J.G. Weisser Söhne, St. Georgen (DE)

( * ) Notice: Subject to any disclaimer, the term of this patent is extended or adjusted under 35 U.S.C. 154(b) by 189 days.

(21) Appl. No.: 10/601,194

(22) Filed: Jun. 23, 2003

(65) Prior Publication Data

US 2005/0061120 A1    Mar. 24, 2005

(51) Int. Cl.
*B23B 3/00* (2006.01)
*B23B 21/00* (2006.01)

(52) U.S. Cl. .......................................... 82/122; 82/132

(58) Field of Classification Search .................. 82/122, 82/121, 124, 132, 138, 159, 162; 29/38 A, 29/27 R See application file for complete search history.

(56) References Cited

U.S. PATENT DOCUMENTS

| | | | | |
|---|---|---|---|---|
| 4,730,373 | A * | 3/1988 | Senoh ........................ | 29/26 A |
| 5,313,694 | A * | 5/1994 | Yonemoto et al. .......... | 29/27 R |
| 6,760,961 | B2 * | 7/2004 | Upadhya .................... | 29/27 C |
| 6,945,147 | B2 * | 9/2005 | Sakashita .................... | 82/149 |

FOREIGN PATENT DOCUMENTS

| | | |
|---|---|---|
| DE | 34 16 660 | 11/1985 |
| DE | 42 12 175 | 10/1993 |
| DE | 196 07 883 | 9/1997 |
| DE | 198 51 228 | 5/2000 |

* cited by examiner

*Primary Examiner*—Willmon Fridie, Jr.
(74) *Attorney, Agent, or Firm*—The Nath Law Group; Jerald L. Meyer; Derek Richmond

(57) ABSTRACT

A lathe exhibits a vertically positioned, motor-driven work spindle on whose lower end are positioned workpiece clamps, an initial compound slide system (19) by means of which the work spindle can move vertically in the Z1 direction and horizontally in the X1 direction, at least one initial stationary tool holder (22), and at least one second tool holder (46) which can execute an advancing action in at least one direction during the machining process. The advancing movement of the second tool holder (46) is independent of the control of the first compound slide system (19). The second tool holder (46) can be moved in controlled fashion along two axes by a second compound slide system (28, 30, 32, 34). The movement of the second tool holder (46) is synchronized with the movement of the first compound slide system (19) in such a way that the movement of the second tool holder (46) is an arithmetic overlay of the movement of the first compound slide system (19) and the relative movement between the workpiece and the second tool holder (46).

10 Claims, 5 Drawing Sheets

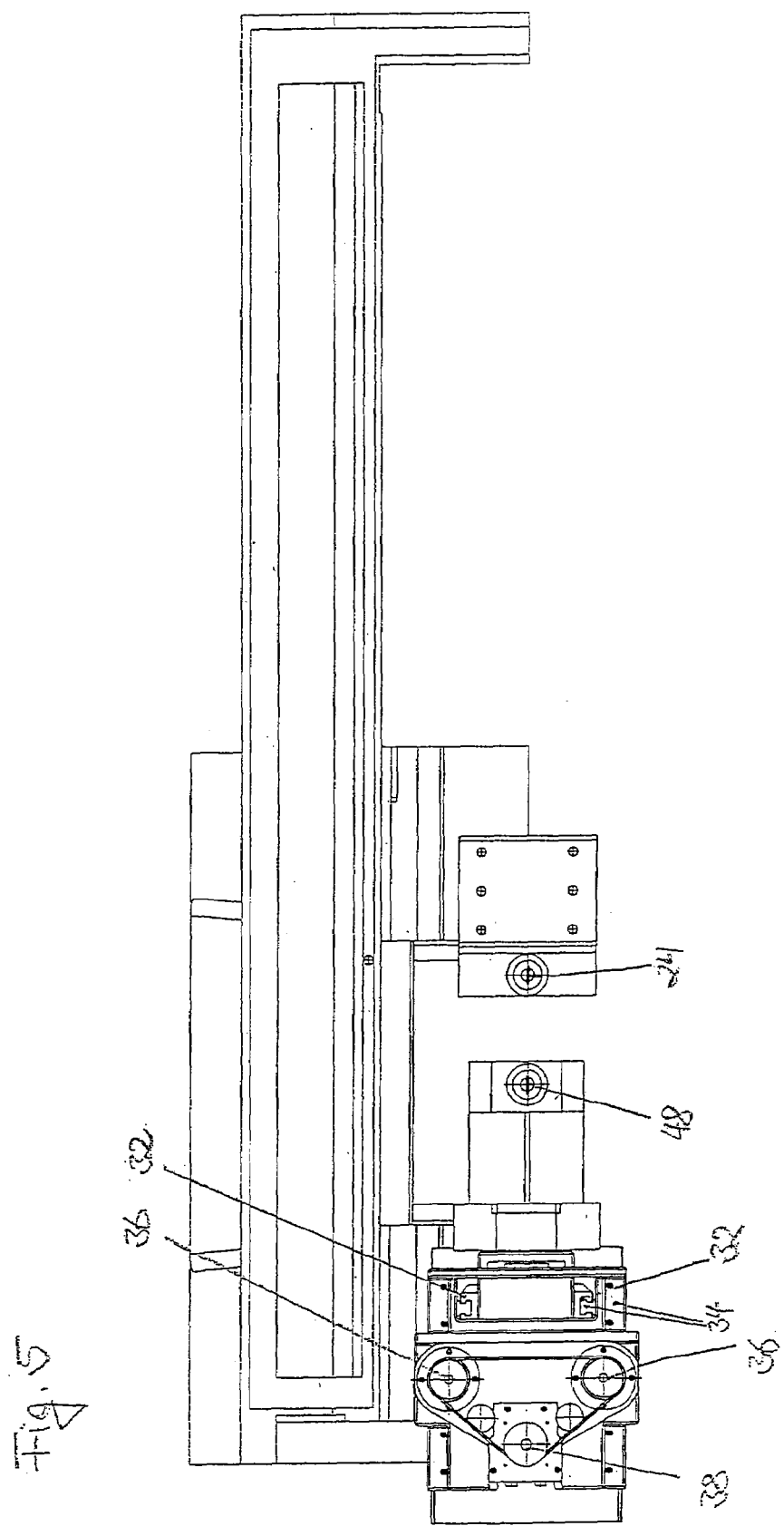

LATHE

BACKGROUND OF THE INVENTION (1) Field of the Invention

The invention relates to a lathe with a vertically positioned motor-driven work spindle on whose lower end are positioned workpiece clamps, with an initial compound slide system by means of which the work spindle can move vertically in the Z1 direction and horizontally in the X1 direction, with at least one initial stationary tool holder, and with at least one second tool holder which can execute an advancing action in at least one direction during the machining process, while the advancing movement of the second tool holder is independent of the control of the first compound slide system.

Lathes of this type, which are known, e.g., from DE 34 16 660 C2, have proven their usefulness in many ways. In such tooling machines clamping means are used to mount the workpiece in suspended fashion on a vertical work spindle, which is driven with a motor. A compound slide system is employed to move the work spindle in the vertical direction Z1 and in the horizontal direction X1. In this way the work spindle can be moved between a workpiece transfer point and a work space. At the workpiece transfer point the work spindle takes up the workpiece being machined, or releases a machined workpiece. In the work space the workpiece is lathed by a stationary tool as the work spindle executes the Z1 and X1 advancing actions of the machining process.

DE 196 07 883 A1 describes a lathe with the capability of passing a workpiece between two clamping chucks each belonging to a work spindle and of using a tool to machine in both clamps. Simultaneous machining of the workpieces with two tools is not possible here; when one tool is at work the other is blocked. An exemplary embodiment in DE 196 07 883 A1, FIGS. 14 and 15, shows the addition of a third tool holder so as to permit a workpiece in a defined position to be machined with two tools. One tool is in fixed position, the second can be moved along an axis. Since the second tool only moves along an axis perpendicular to the rotational axis of the workpiece that is being machined, simultaneous machining is not provided—only a rapid changeover from machining with the first tool to machining with the second tool.

SUMMARY OF THE INVENTION

The goal of the invention is to further develop a tooling machine of this type, so as to make possible a more versatile kind of tooling.

(2) Description of Related Art

The invention achieves this goal with a machine tool exhibiting the features of a second tool holder which can be moved in a controlled fashion along two axes by a second compound slide system and in which the movement of the second tool holder is synchronized with the movement of the first compound slide system in such a way that the movement of the second tool holder is an arithmetic overlay of the movement of the first compound slide system and the relative movement between the workpiece and the second tool holder.

Advantageous embodiments of the invention are the axes of movement of the first compound slide system and the axes of movement of the second compound system run parallel to each other. The second tool holder and any additional tool holders are positioned on a turret holder plate, and the corresponding guides and their drives are consolidated into a structural module. A machine tool table with two columns is provided, a work space is positioned between the two columns, and the first tool holder and the structural module for the second tool holder are positioned between the columns on opposite sides of the work space.

According to the invention, the machine tool exhibits, in addition to the stationary tool of the conventional vertical lathe, a second tool holder, which permits advancing action on two axes. As a result, the workpiece can be independently tooled with a second tool at the same time that it is machined with the first tool. The two axes of the second tool holder permit a complete lathing operation, independent of the lathing operation performed with the first tool. The simplest kind of control is achieved when the second tool holder moves in the Z2 and X2 direction parallel to the axes of the work spindle. The machining of the workpiece with the first tool is determined by the advancing action of the work spindle. The advancing action of the second tool is independent of the advancing action of the work spindle, but control technology allows it to be synchronized and coordinated with the advancing action of the work spindle in such a way that the desired machining of the workpiece results from an overlay of the advancing actions of the work spindle and the second tool holder.

With the lathe according to the invention a workpiece can be machined simultaneously with two tools, in the process of which the two tools can each execute a lathing operation independent of the other. Machining stages which in conventional pick-up lathes must be performed in succession can now be performed simultaneously, resulting in a reduction in the time required for machining. For example, the inner profile and the outer profile of a workpiece, or axially adjoining sections of a workpiece, can be machined simultaneously.

The tool holders can be designed in the form of turret holder plates, thereby permitting different tools to be brought into operating position.

It is also possible to use driven tool systems so that, in addition to lathing, the workpiece can be drilled, milled, or polished. Such driven tool systems can be provided in the form of an individual tool or can be integrated into a turret holder plate.

BRIEF DESCRIPTION OF THE DRAWINGS

In the following the invention will be described in greater detail on the basis of an exemplary embodiment shown in the drawing. The drawing shows.

DETAILED DESCRIPTION OF THE INVENTION

Figure 1:
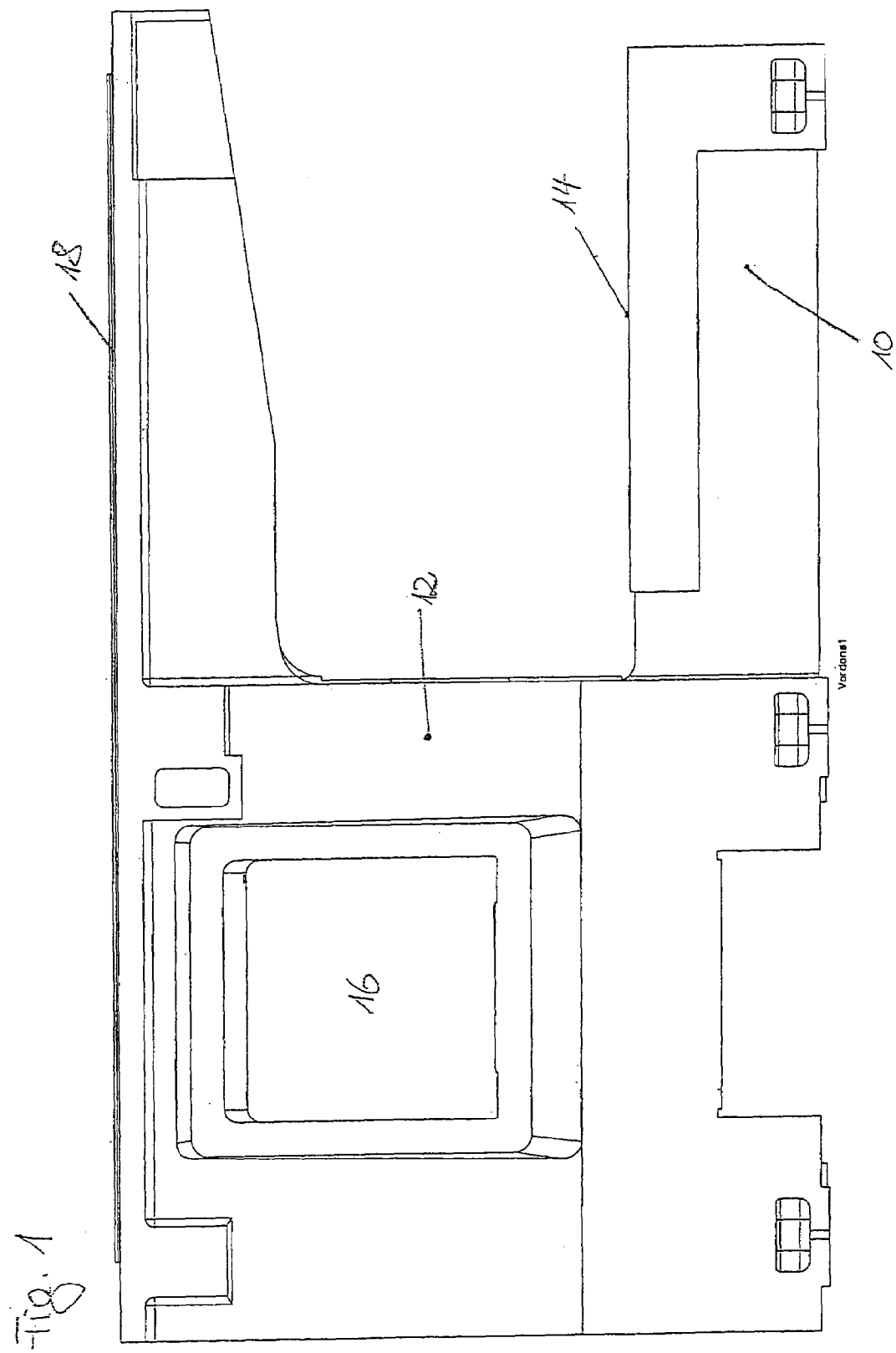
FIG. 1 a lateral view of the machine tool table for the lathe according to the invention FIG. 2 a front view of the machine tool table FIG. 3 a lateral depiction of the work space of the lathe FIG. 4 a front view of the compound slide system of the second tool holder along line B—B FIG. 5 a horizontal section through this compound slide system along line D—D in FIG. 3.
Figure 2:
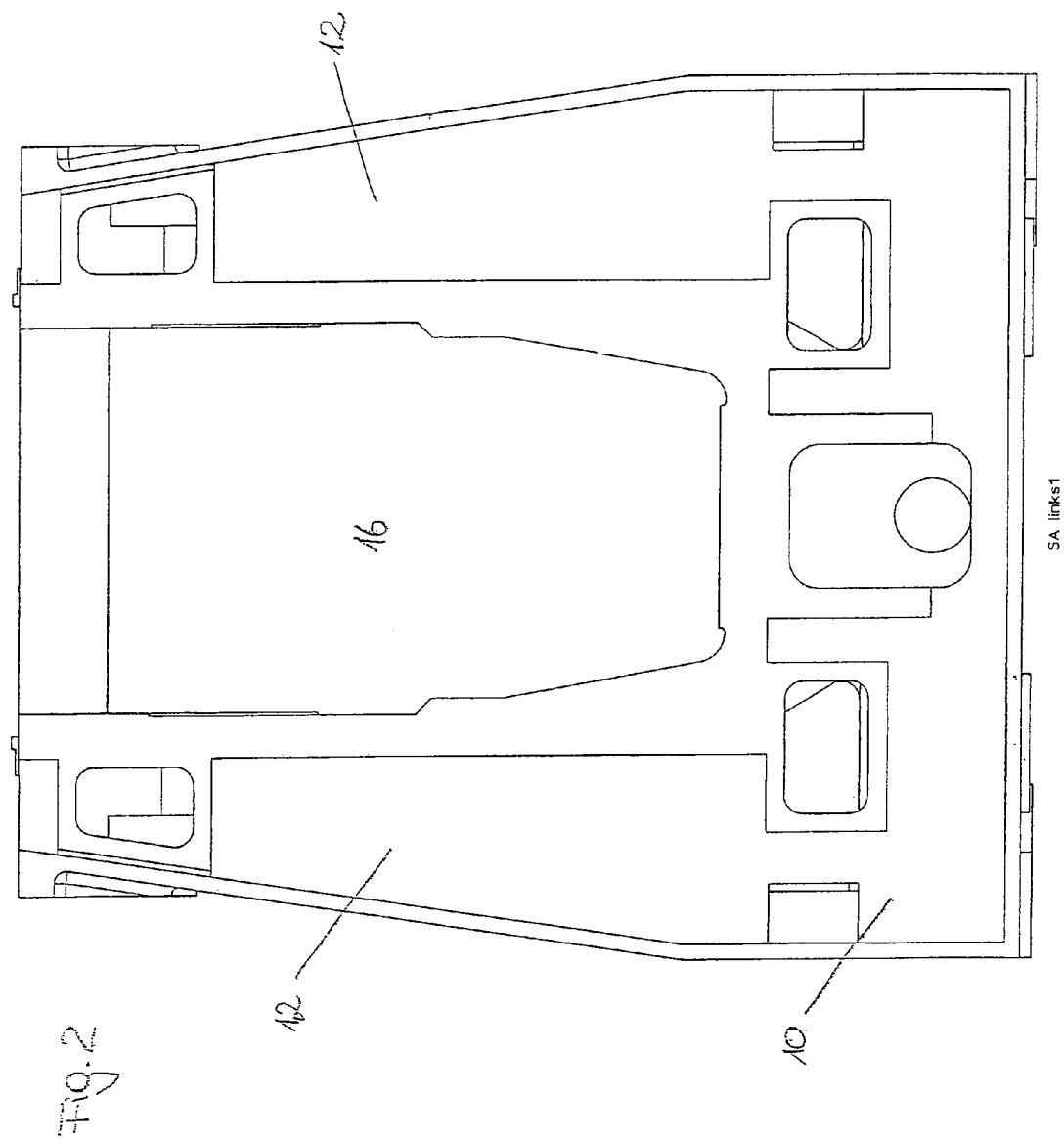

The machine tool table shown in FIGS. 1 and 2 exhibits a machine bed 10, from which two columns 12 project upwardly. In the right terminal area of the machine tool table shown in FIG. 1 the surface of the machine bed 10 is designed as the workpiece transfer point 14. The workpiece transfer point 14 serves to feed and remove the workpieces.

On the upper side of the machine tool table the columns 12 project freely over the workpiece transfer point 14, as can be clearly seen in FIG. 1.

In the left portion of the machine tool table, as shown in FIG. 1, there is a work space 16, which is located between the columns 12 and above the machine bed 10. The work space 16 is open in the direction of both sides of the machine tool table in order to made the work space 16 accessible to the operating personnel. In the downward direction the work space 16 is open in order to permit chips to fall freely to a chip conveyor running through the machine bed 10 below the work space 16.

Horizontal X1 guides 18 are applied to the upper edge of the columns 12 and to the portion of the columns that projects over the workpiece transfer point 14. The X1 slide of an initial compound slide system 19 runs on these X1 guides. Applied in vertical moving fashion to the X1 slide is a Z1 slide belonging to the first compound slide system 19. The Z1 slide carries a vertical, motor-driven work spindle, whose lower end holds a workpiece clamp 20. The work spindle runs centrally between the two columns 12.

An initial tool holder is applied to the machine bed 10 at a point between the workpiece transfer point 14 and the working space 16. This first tool holder 22 projects into the work space 16 and holds an initial stationary lathe 24.

To this extent the lathe operates according to the principle of the pick-up vertical lathe, which is known to the prior art. The raw workpieces to be machined are conveyed to the workpiece transfer point 14 by a transport system, which is not depicted in the figures. The work spindle is moved above the workpiece transfer point 14 by the X1 slide. From there the work spindle is lowered by the Z1 slide, so that it can take up the raw workpiece using the clamps 20. The workpiece is brought by the first compound slide system through the two columns 12 into the work space 16. There the workpiece is lathed by the first tool 24. The lathing work is performed with the tool 24 in stationary position; the axial advancing action is controlled by the Z1 slide and the radial stroke is controlled by the X1 slide. The machined workpiece is again brought by the first compound slide system 19 into a position above the workpiece transfer point 14 and is there deposited onto the transport device, which is not shown in the drawing.

This machining capability, which corresponds to the conventional pickup vertical lathe, is further developed by the invention in the manner described below.

Figure 3:
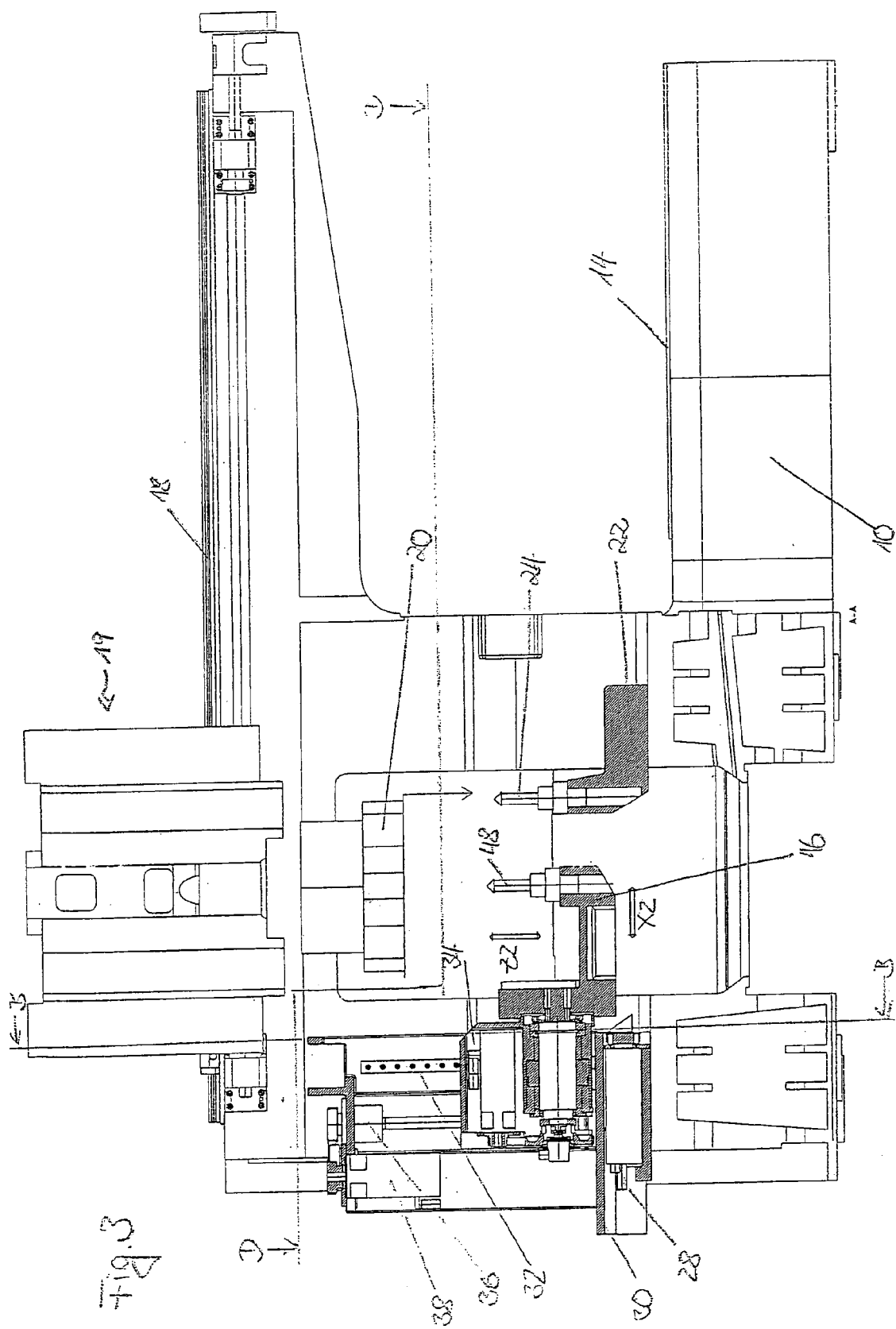
Figure 4:
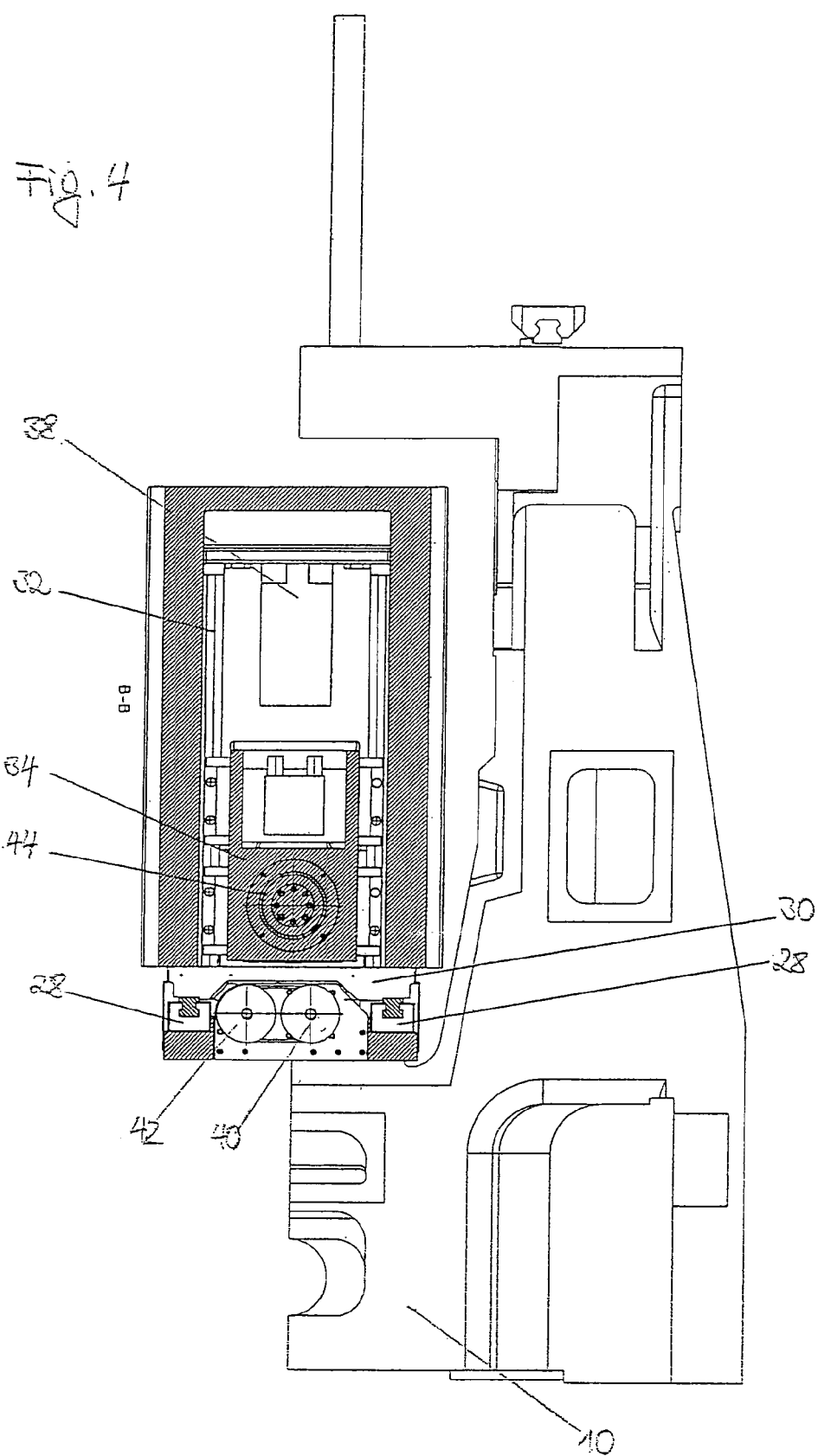

On the side of the work space 16 opposite the first tool holder 22 a second compound slide system 30, 34 is positioned on the machine bed 10 between the columns 12. This second compound slide system 30, 34 exhibits horizontal X2 guides 28, which run parallel to the X1 guides and are attached to the machine bed 10 between the columns 12. An X2 slide 30 runs on these X2 guides 28. The X2 slide 30 carries vertical Z2 guides 32, on which a Z2 slide 34 runs in vertical fashion. Parallel to the Z2 guides 32 are two ball caster spindles 36, which are driven by a shared servo-motor 38 and deliver the Z2 slide 34 with a high degree of accuracy. The X1 advancing action is performed in corresponding fashion by a ball caster spindle 40 and a servo-motor 42, which are positioned in horizontal and parallel fashion between the X2 guides 28. The X2 and Z2 directions of motion are indicated in FIG. 3.

Positioned on the vertical face of the Z2 slide 34 turned toward the work space 16 is a turret holder plate 44, which can rotate on a horizontal axis that is parallel to the X2 axis. Second tool holders 46 carrying second lathing tools 48 can be positioned on the turret holder plate 44. A second tool holder 46 of this kind is depicted in FIG. 3, along with a lathing tool 48. Instead of the second tool holder 46, drivable tool units can be integrated into the turret holder plate 44.

Simultaneous with the machining performed by the first tool 24 the workpiece 26 can be tooled with a second tool 48. The control of the second compound slide system 30, 34 in the Z2 and X2 direction is separate from the control of the first compound slide system 19 in the Z1 and X1 direction. However, the control of the second compound slide system 30, 34 is exactly synchronized in time with the control of the first compound slide system 19. In addition, the control of the second compound slide system 30, 34 is arithmetically adjusted to the control of the first compound slide system 19 in such a way that the advancing movement of the second tool 48 vis-à-vis the workpiece 26 results from the arithmetic overlay of the advancing action of the first compound slide system 19 and the second compound slide system 30, 34.

As a result, two different areas of the workpiece 26 can be simultaneously machined by the first tool 24 and the second tool 48. For example, if the workpiece 26 is a bicycle wheel, it will be possible to lathe the inner profile with the first tool 24 and to simultaneously lathe the outer profile with the second tool 48. It is likewise possible to simultaneously lathe an initial axial area of the profile with the first tool 24 and a second adjoining axial area of the profile with the tool 48. The result is a reduction by half in the machining time.

The second compound slide system 30, 34 with the turret holder plate 44 and the corresponding drives will ideally be consolidated into a structural module that can be mounted on the machine bed 10 between the columns 12. This makes it possible to produce the vertical lathe selectively, with or without the additional machining capability provided by the invention. It is also possible to perform a simple retrofitting for the additional machining capability.

LIST OF REFERENCE NUMERALS

10 machine bed
12 columns of machine tool table
14 transfer point for workpiece
16 work space
18 X1 guides
19 first compound slide system
20 clamp
22 first tool holder
24 first tool
28 X2 guides
30 X2 slides
32 Z2 guides
34 Z2 slides
36 ball caster spindle
38 servo-motor
40 ball caster spindle
42 servo-motor
44 turret holder plate
46 second tool holder
48 second tool

The invention claimed is:

1. A lathe comprising:
    a vertically positioned motor-driven work spindle on whose lower end are positioned workpiece clamps, an initial compound slide system by means of which the work spindle can move vertically in a Z1 direction and horizontally in an X1 direction,
    at least one initial stationary tool holder, and at least one second tool holder which can execute an advancing action in at least two directions during the machining process, while the advancing movement of the second tool holder is independent of but synchronized with the control of the first compound slide system, wherein the second tool holder (46) is movable in a controlled fashion vertically in a Z2 direction and horizontally in an X2 direction by a second compound slide system (28, 30, 32, 34); and wherein the movement of the second tool holder (46) is synchronized with the movement of the first compound slide system (19) in such a way that the movement of the second tool holder (46) provides an arithmetic overlay of the movement of the first compound slide system (19) and the independently controlled relative movement between the workpiece and the second tool holder (46).

2. A lathe according to claim 1, wherein the axes of movement (Z1, X1) of the first compound slide system (19) and the axes of movement (Z2, X2) of the second compound system (28, 30, 32, 34) run parallel to each other.

3. A lathe according to claim 1, wherein at least the second tool holder (46) is positioned on a turret holder plate (44).

4. A lathe according to claim 1, wherein at least the second tool holder (16), and the corresponding guides (28, 30, 32, 34), and drives (36, 38, 40, 42) are consolidated into a structural module.

5. A lathe according to claim 4, wherein a machine tool table with two columns (12) is provided, a work space (16) is positioned between the two columns (12), and the first tool holder (22) and the structural module for the second tool holder (46) are positioned between the columns (12), on opposite sides of the work space (16).

6. A lathe according to claim 2, wherein at least the second tool holder (46) is positioned on a turret holder plate (44).

7. A lathe according to claim 2, wherein at least the second tool holder (16), and the corresponding guides (28, 30, 32, 34), and drives (36, 38, 40, 42) are consolidated into a structural module.

8. A lathe according to claim 7, wherein a machine tool table with two columns (12) is provided, a work space (16) is positioned between the two columns (12), and the first tool holder (22) and the structural module for the second tool holder (46) are positioned between the columns (12), on opposite sides of the work space (16).

9. A lathe according to claim 3, wherein at least the second tool holder (16), and the corresponding guides (28, 30, 32, 34), and drives (36, 38, 40, 42) are consolidated into a structural module.

10. A lathe according to claim 9, wherein a machine tool table with two columns (12) is provided, a work space (16) is positioned between the two columns (12), and the first tool holder (22) and the structural module for the second tool holder (46) are positioned between the columns (12), on opposite sides of the work space (16).

* * * * *